US007817929B2

(12) United States Patent
Booth et al.

(10) Patent No.: US 7,817,929 B2
(45) Date of Patent: Oct. 19, 2010

(54) SYSTEM AND METHOD FOR ADJUSTING SELECTED OPERATING PARAMETERS OF IMAGE FORMING DEVICE BASED ON SELECTED ENVIRONMENTAL CONDITIONS TO IMPROVE COLOR REGISTRATION

(75) Inventors: Robert Reed Booth, Lexington, KY (US); Ryan David Brockman, Lexington, KY (US); Kerry Leland Embry, Midway, KY (US); Paul Wesley Etter, Lexington, KY (US); Claudia Alexandra Marin, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 198 days.

(21) Appl. No.: 12/240,572

(22) Filed: Sep. 29, 2008

(65) Prior Publication Data

US 2010/0080587 A1 Apr. 1, 2010

(51) Int. Cl.
*G03G 15/00* (2006.01)
*G03G 15/01* (2006.01)
*B41J 2/385* (2006.01)
*G01D 15/06* (2006.01)

(52) U.S. Cl. .......................... 399/44; 399/301; 347/116

(58) Field of Classification Search .................. 399/44, 399/46, 50, 53, 94, 97, 301; 347/116
See application file for complete search history.

(56) References Cited

U.S. PATENT DOCUMENTS 5,552,862 A * 9/1996 Masuda et al. ................ 399/44
6,968,148 B2 * 11/2005 Taka et al. .................. 399/301
7,239,833 B2 * 7/2007 Tomita et al. ........... 399/301 X
7,257,358 B2 8/2007 Overall et al.

* cited by examiner

*Primary Examiner*—Sandra L Brase

(57) ABSTRACT

A system for adjusting selected operating parameters of an image forming device to improve color registration based on selected environmental conditions includes a first image forming station to print a first registration mark on a substrate, a second image forming station to at least partially erase the first registration mark to form a registration pattern in a reverse transfer process of the color registration, and a control mechanism to adjust voltage biases of charge and developer rolls of the second image forming station based on wet-bulb temperature values determined from measured dry-bulb temperature and relative humidity values and stored in a lookup table so as to maintain a predetermined potential difference between charged and uncharged areas of a PC drum of the second image forming station that avoids Paschen breakdown and the development of toner at charged areas of the PC drum during the reverse transfer process of the color registration.

16 Claims, 5 Drawing Sheets

| WET BULB TEMP (°C) | COLD START SERVO (V) (IF NO T/H MISSING OR READING IS INVALID | K CHARGE ROLL BIAS (V) | K DEV. ROLL BIAS (V) | M CHARGE ROLL BIAS (V) | M DEV. ROLL BIAS (V) | C CHARGE ROLL BIAS (V) | C DEV. ROLL BIAS (V) | Y CHARGE ROLL BIAS (V) | Y DEV. ROLL BIAS (V) |
|---|---|---|---|---|---|---|---|---|---|
| 24 | 500 | -1450 | -600 | -1150 | -175 | -1150 | -175 | -1150 | -200 |
| 18 | 1100 | -1450 | -600 | -1275 | -150 | -1275 | -150 | -1275 | -150 |
| 10 | 2700 | -1450 | -600 | -1425 | -125 | -1425 | -125 | -1425 | -125 |

AUTO-ALIGNMENT OP POINTS FOR DEVICE WITH INDEPENDENT CHARGE SUPPLIES AND COLOR ORDER 1-BLACK, 2-MAGENTA, 3-CYAN, 4-YELLOW

*Fig. 4*

| WET BULB TEMP (°C) | COLD START SERVO (V) (IF NO T/H MISSING OR READING IS INVALID | CHARGE ROLL BIAS (V) | K DEV. ROLL BIAS (V) | M DEV. ROLL BIAS (V) | C DEV. ROLL BIAS (V) | Y DEV. ROLL BIAS (V) |
|---|---|---|---|---|---|---|
| 24 | 500 | -1150 | -450 | -175 | -175 | -200 |
| 18 | 1100 | -1275 | -525 | -150 | -150 | -150 |
| 10 | 2700 | -1425 | -600 | -125 | -125 | -125 |

AUTO-ALIGNMENT OP POINTS FOR DEVICE WITH SHARED CHARGE SUPPLY AND COLOR ORDER 1-BLACK, 2-MAGENTA, 3-CYAN, 4-YELLOW

*Fig. 5*

SYSTEM AND METHOD FOR ADJUSTING SELECTED OPERATING PARAMETERS OF IMAGE FORMING DEVICE BASED ON SELECTED ENVIRONMENTAL CONDITIONS TO IMPROVE COLOR REGISTRATION

CROSS REFERENCES TO RELATED APPLICATIONS

None.

BACKGROUND

1. Field of the Invention

The present invention relates generally to an electrophotographic (EP) image forming device and, more particularly, to a system and method for adjusting operating parameters, namely, bias voltages of charge and developer rolls, of the image forming device based on selected environmental conditions, namely, wet-bulb temperature values derived from dry-bulb temperature sensor and relative humidity sensor readings, to improve color registration.

2. Description of the Related Art

An EP image forming device, such as a single pass EP printer, typically employs four image forming stations, each one responsible for printing one of four primary colors, typically cyan, magenta, yellow, and black. The individual images, known as separations, produced by each of the four image forming stations are combined to produce the final output image. In tandem print engines, the four image forming stations are aligned in the sheet transport direction such that each separation is formed in succession on the copy sheet as the copy sheet is transported through each print station. Typically, a belt transports the copy sheet. In some printers, a belt serves as an intermediate transfer member (ITM). The image forming stations transfer the individual image separations onto the ITM to form a composite image on the ITM. The composite image is then transferred from the ITM to the copy sheet at a transfer station.

The alignment of the image separations produced by each image forming station is critical to producing a quality printed image. Various factors affect the proper alignment of the image forming stations, such as tolerances, wear, and thermal expansion and contraction. It can be expensive and impractical to control tolerances and wear in order to provide acceptable color registration. Therefore, many printers employ various other techniques to detect and correct for color registration errors.

One technique used to detect color registration errors, referred to as the reverse transfer process, is disclosed in U.S. Pat. No. 7,257,358 assigned to the assignee of the present application. The entire disclosure of this patent is hereby incorporated herein by reference. The basic idea underlying the reverse transfer process, as explained in this patent, is to print a registration mark at a first image forming station and to partially erase or remove the registration mark, printed by the first image forming station, at a second image forming station by reverse transfer of the toner. The registration mark may be printed, for example, on the media transport belt, on an ITM belt, on a media sheet, or some other substrate. The second image forming station does not print a registration mark, but instead partially erases the registration mark printed by the first image forming station to form the final registration pattern. A latent image of a second registration mark is formed by a laser as a discharged area on a photoconductive (PC) drum at the second image forming station, but is not developed. A controller controls the charge of the PC drum and a transfer device so that the PC drum attracts toner from the media transfer belt or ITM belt in areas when the latent image of the second registration mark overlap the first registration mark. When a registration sensor detects that certain specified portions of the first registration mark are completely or nearly completely erased by the overlapping latent image of the second registration mark, there is considered to be no registration error present.

In general, the reverse transfer of toner is maximized when the charge on the PC drum is as high as possible and the voltage of the discharged area is as low as possible. This allows for the largest contrast between charged and discharged areas. The high PC drum charge prevents reverse transfer to areas not discharged by the laser. The low discharge voltage is desirable to create the least negatively charged surface that acts in conjunction with the negative transfer voltage to best attract the negatively-charged toner. Therefore, high charge voltages and high laser energies are desirable.

However, because the developer roll bias in the "reverse transfer" station must be set sufficiently low in order to prevent the development of toner there may be a large difference in potential between the bias on the developer roll and the charge on the PC drum surface. If the potential difference is sufficiently large it may cause Paschen breakdown at the interface between the developer roll and PC drum. (Paschen breakdown voltage is one at which the insulation of air breaks down and an avalanche condition ensues allowing flow of ions.) If there is Paschen breakdown at this interface, some of the toner on the developer roll may become wrong-signed and then transfer to the PC drum and the belt. This wrong-signed toner can interfere with the registration sensor's ability to detect the registration pattern. In some embodiments black toner registration patterns are being sensed on a black belt. Because the reflectivity of the toner may be similar to that of the belt, a higher gain mode may be required. Under these circumstances cyan, magenta, or yellow wrong-signed toner can have a particularly detrimental effect on the sensor's ability to detect the registration patterns.

Paschen breakdown between the developer roll and PC drum also happens at a lower potential difference in certain environmental conditions of temperature and humidity. Although a majority of color laser printers operate in an air-conditioned office environment, such environment may not necessarily be controlled for humidity. It is important that a printer yields high print quality over a wide range of environments. As temperature and humidity of the ambient environment change, the electrical properties of printer components can also change which can have a significant impact on print quality. Heretofore, "cold start" servo voltage has been used to select or adjust charge roll and developer roll biases. Cold start servo voltages are the servo values recorded when the printer is first powered on or after the printer has been idle. However, changes to the printer architecture have made servo algorithms less accurate for optimizing charge roll and developer roll biases to optimize registration operating parameters in all environments.

Thus, when using the reverse transfer process in correcting registration errors, there is a need for an innovation to compensate for environmental conditions of temperature and humidity in order to maintain the maximum potential difference between the charged and discharged areas on the PC drum while still avoiding Paschen breakdowns.

SUMMARY OF THE INVENTION

The present invention meets this need by providing an innovation directed toward adjusting certain selected operating parameters, namely, bias voltages applied to the charge roll and developer roll, based on wet-bulb temperature values derived from dry-bulb temperature and relative humidity readings from sensors of current environmental conditions, in place of cold start servo voltage values as practiced heretofore. These adjustments will allow for better charge roll voltage optimization and thus better print quality and color registration.

Accordingly, in an aspect of the present invention, a system for adjusting selected operating parameters of an image forming device based on selected environmental conditions to improve color registration includes a first image forming station to print a first registration mark on a substrate, a second image forming station having a photoconductive unit, a charging unit and a developer unit cooperable together so as to at least partially erase the first registration mark printed on the substrate by the first image forming station to form a registration pattern in a reverse transfer process of the color registration, a sensor mechanism for measuring selected environmental conditions of dry-bulb temperature and relative humidity, a control mechanism for reading the sensor mechanism to adjust the voltage biases of the charging and developer units of the second image forming station based on a wet-bulb temperature value so as to maintain a predetermined potential difference between charged and uncharged areas of the photoconductive unit of the second image forming station that avoids Paschen breakdown and the development of toner at charged areas of the photoconductive unit during the reverse transfer process of the color registration, and a memory connected to and accessible by the control mechanism and having a lookup table stored therein containing lists of correlated values comprising a list of wet-bulb temperature values related to values of dry-bulb temperature and relative humidity measured by the sensor mechanism correlated with lists of voltage values related to voltage biases of the charging and developer units to maintain the predetermined potential difference between the charged and uncharged areas of the photoconductive unit during the reverse transfer process of the color registration.

In another aspect of the present invention, a method for adjusting selected operating parameters of an image forming device based on selected environmental conditions to improve color registration includes at a first image forming station printing a first registration mark on a substrate, at a second image forming station at least partially erasing the first registration mark printed on the substrate by the first image forming station to form a registration pattern in a reverse transfer process of the color registration performed at the second image forming station, sensing selected environmental conditions of dry-bulb temperature and relative humidity so as to determine wet-bulb temperature values correlated with the dry-bulb temperature and relative humidity, and adjusting voltage biases of charge and developer rolls of the second image forming station based on the wet-bulb temperature value so as to maintain a predetermined potential difference between charged and uncharged areas of a photoconductive unit of the second image forming station that avoids Paschen breakdown and the development of toner at charged areas of the photoconductive unit during the reverse transfer process of the color registration. The method further includes storing a lookup table in memory containing lists of correlated values comprising a list of wet-bulb temperature values related to values of sensed dry-bulb temperature and relative humidity correlated with lists of voltage values related to voltage biases of the charging and developer units to maintain the predetermined potential difference between the charged and uncharged areas of the photoconductive unit during the reverse transfer process of the color registration.

BRIEF DESCRIPTION OF THE DRAWINGS

Figure 1:
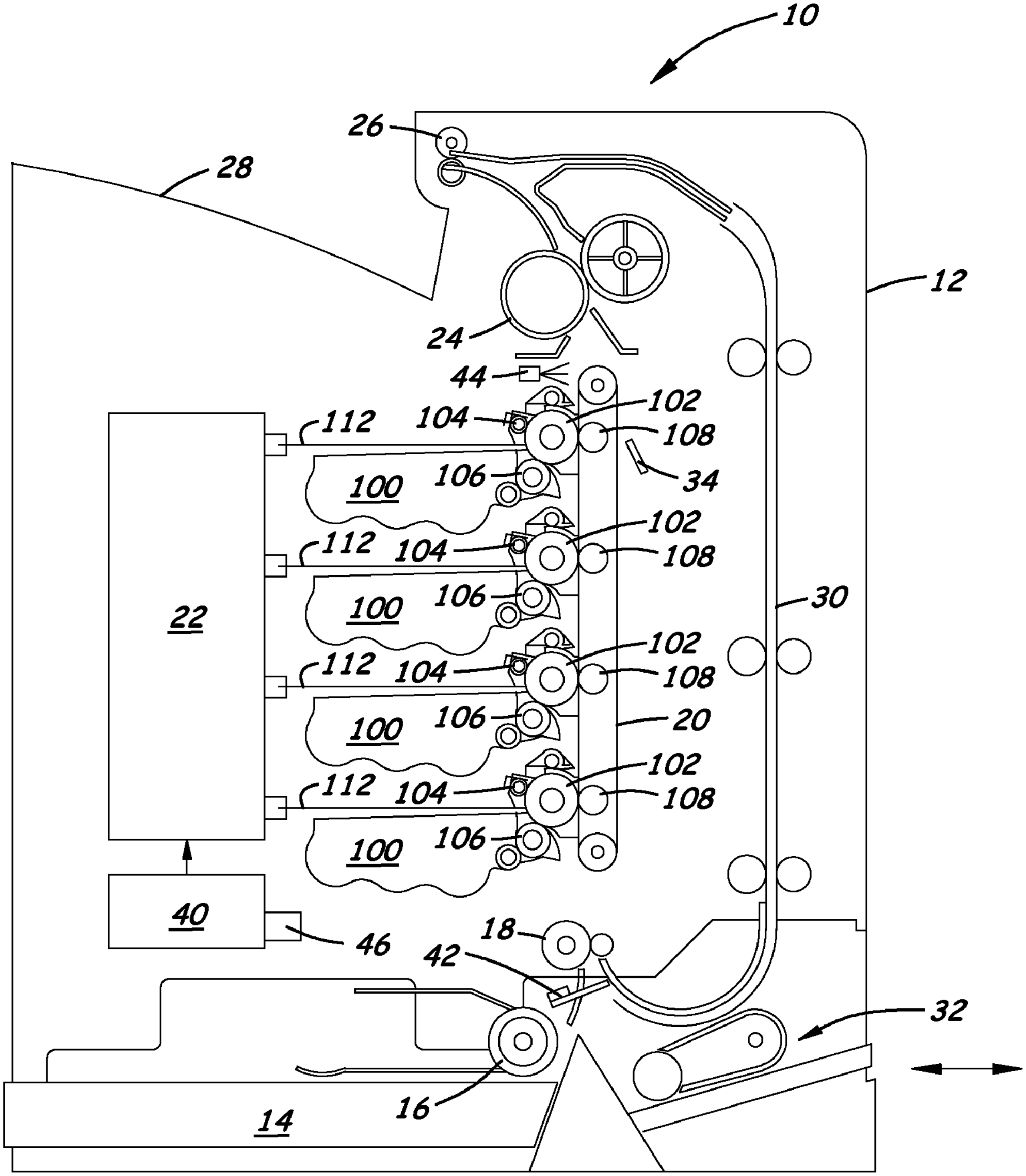

Having thus described the invention in general terms, reference will now be made to the accompanying drawings, which are not necessarily drawn to scale, and wherein:

FIG. 1 is a schematic view of an EP image forming device to which is applied the system and method of the present invention for adjusting selected operating parameters of the image forming device to improve color registration.

Figure 2:
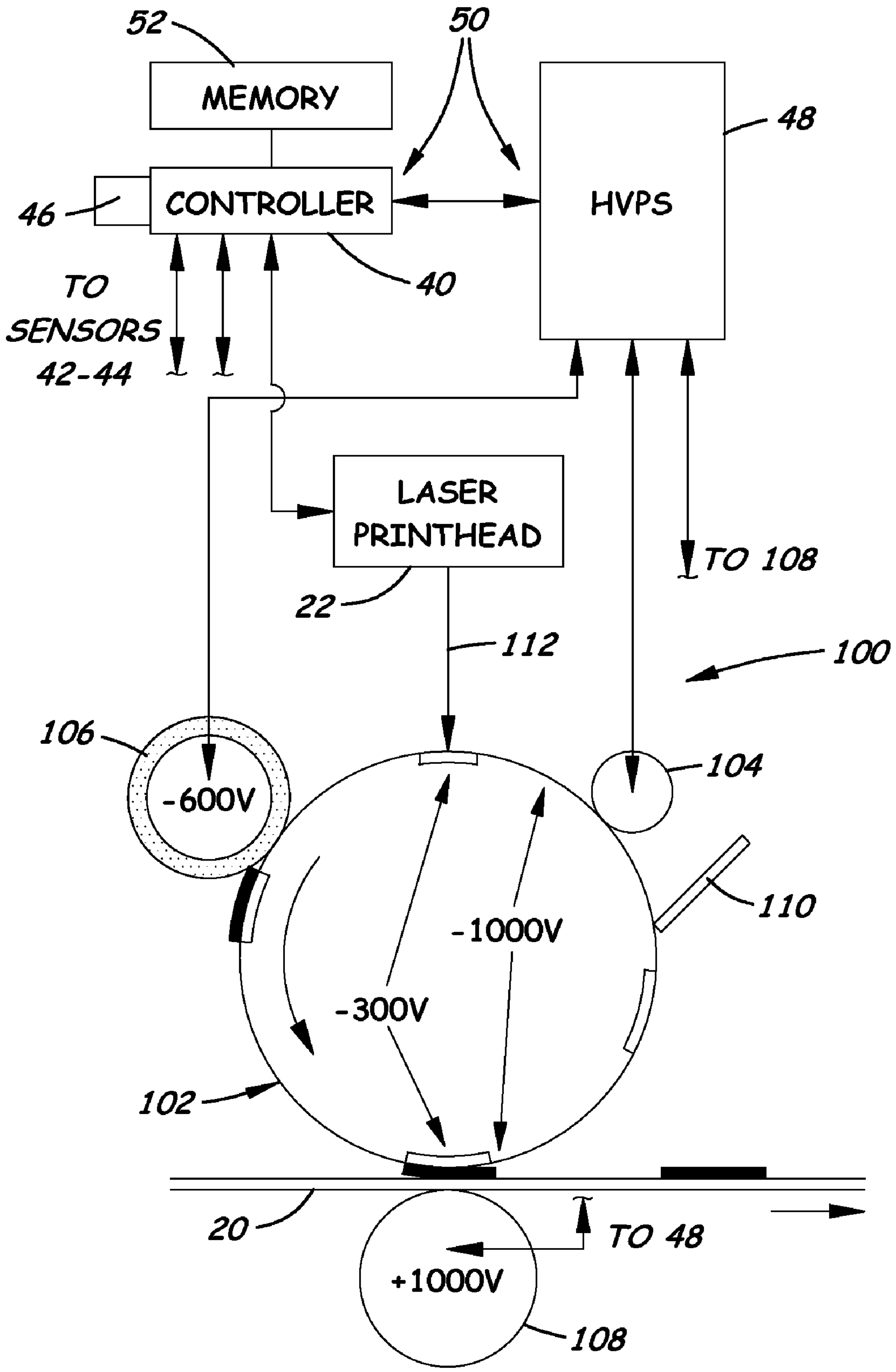

FIG. 2 is a schematic view of one of the image forming stations in the device according to one embodiment of the present invention.

Figure 3:
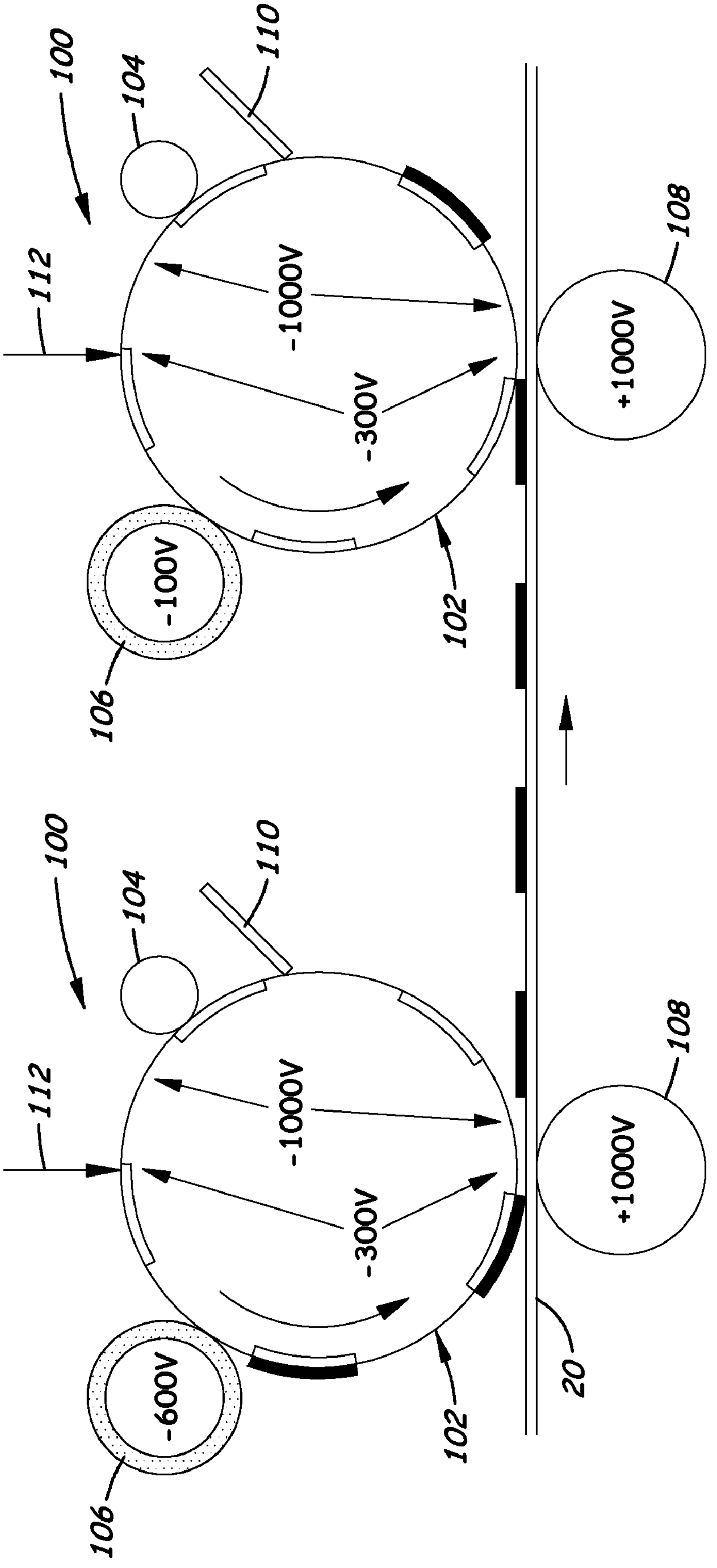

FIG. 3 is a schematic view of an exemplary method of printing registration patterns using the reverse transfer process.

FIG. 4 is a representative lookup table showing charge and developer roll voltage adjustment values correlated with various wet-bulb temperatures according to one embodiment of the present invention.

FIG. 5 is a representative lookup table showing charge and developer roll voltage adjustment values correlated with various wet-bulb temperatures according to one embodiment of the present invention for a device where the charge roll high voltage power supply is shared by image forming and reverse transfer stations.

Figure 6:
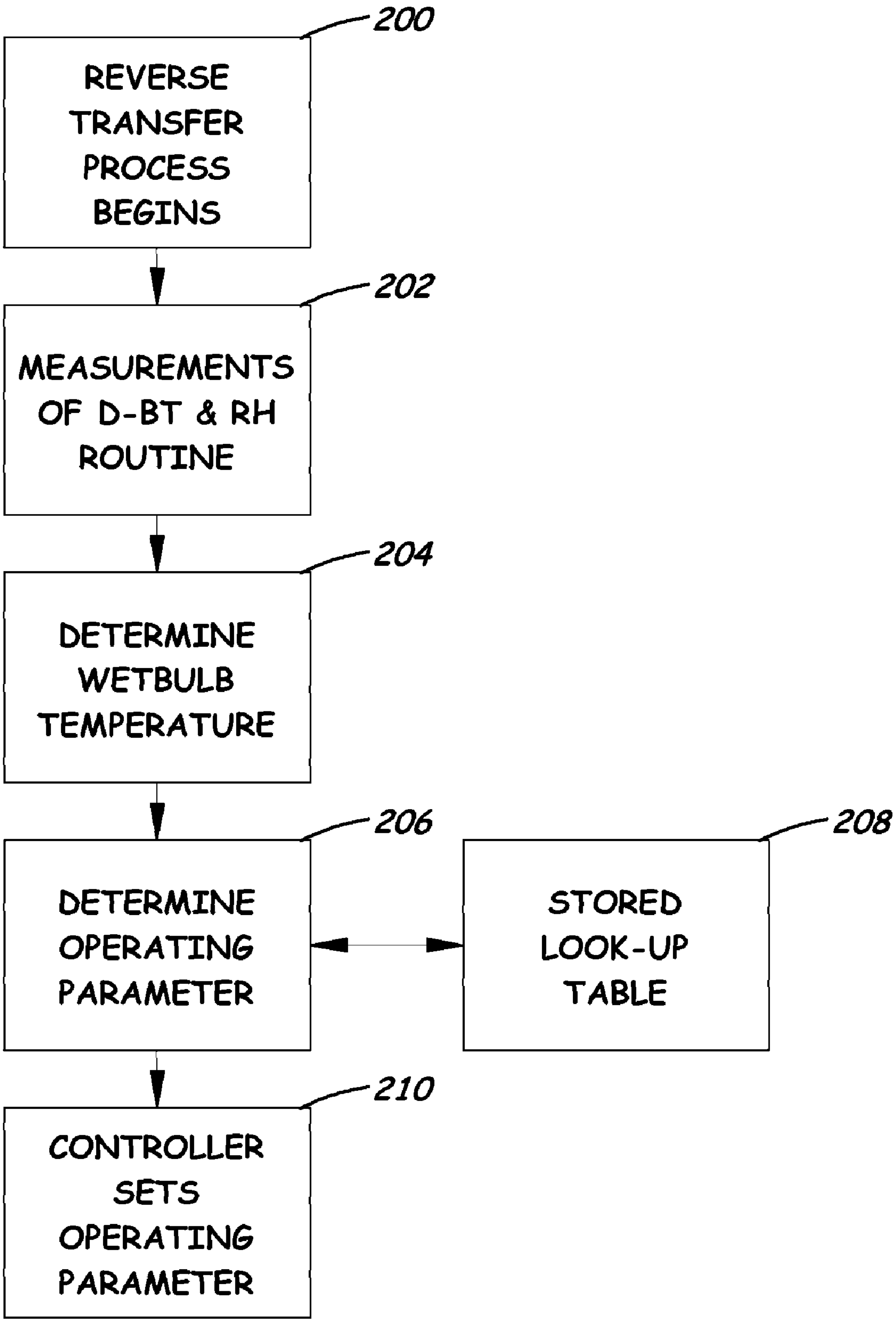

FIG. 6 is a flow diagram illustrating a method by which operating parameters of the image forming device may be adjusted in response to a detected wet-bulb temperature according to one embodiment of the present invention.

DETAILED DESCRIPTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numerals refer to like elements throughout the views.

Referring now to FIG. 1, there is schematically illustrated an EP image forming device, generally designated 10, to which the system and method of the present invention are applicable. The exemplary image forming device 10, which is a laser printer, includes a main body 12, at least one media tray 14, a pick mechanism 16, a registration roller 18, a media transport belt 20, a laser printhead 22, a plurality of image forming stations 100, a fuser roller 24, exit rollers 26, an output tray 28, a duplex path 30, an auxiliary feed 32, and a cleaning blade 34. The media tray 14, disposed in a lower portion of the main body 12, contains a stack of print media on which images are to be formed. Pick mechanism 16 picks up media sheets from the top of the media stack in the media tray 14 and feeds the print media into a primary media path. Registration roller 18, disposed along a media path aligns the print media and precisely controls its further movement along the media path. Media transport belt 20 transports the print media along the media path past a series of image forming stations 100, which apply toner images to the print media.

Color printers typically include four image forming stations 100 for printing with cyan, magenta, yellow, and black toner to produce a four-color image on the media sheet. The media transport belt 20 conveys the print media with the color image thereon to the fuser roller 24, which fixes the color image on the print media. Exit rollers 26 either eject the print media to the output tray 28, or direct it into a duplex path 30 for printing on a second side of the print media. In the latter case, the exit rollers 26 partially eject the print media and then reverse direction to invert the print media and direct it into the duplex path. A series of rollers in the duplex path 30 return the inverted print media to the primary media path for printing on the second side. Also, the auxiliary feed 32 of the image forming device 10 may be utilized to manually feed media sheets into the device 10.

Turning now to FIG. 2, there is a schematic diagram illustrating an exemplary embodiment of one of the image forming stations 100. Each image forming station 100 includes a photoconductor (PC) unit in the form of a PC drum 102, a charging unit in the form of a charge roll 104, a developer unit in the form of a developer roll 106, a transfer unit 108, and a cleaning blade 110. The charge roll 104 charges the surface of the PC drum 102 to approximately −1000 v. An optical scanning device in the form of a laser beam 112 illuminates the PC drum 102 to discharge areas thereon to approximately −300 v to form a latent image on the surface of the PC drum 102. The PC drum core is held at −200 v. The developer roll 106 transfers negatively-charged toner having a core voltage of approximately −600 v to the surface of the PC drum 102 to develop the latent image on the PC drum 102. The toner is attracted to the most positive surface area, ie., the area discharged by the laser beam 112. As the PC drum 102 rotates, a positive voltage field produced by the transfer unit 108 attracts and transfers the toner on the PC drum 102 to the media sheet. Alternatively, the toner images could be transferred to an ITM belt and subsequently from the ITM belt to the media sheet. Any remaining toner on the PC drum 102 is then removed by the cleaning blade 110. The transfer unit 108 may include a roll, a transfer corona, transfer belts, or multiple transfer devices, such as multiple transfer rolls.

Referring to both FIGS. 1 and 2, a controller 40 controls the operation of the image forming device 10. The functions of the controller 40 include timing control and control of image formation. To perform these functions, the controller 40 receives input from a sheet detection sensor 42, a registration sensor 44 and, in accordance with the present invention, also receives inputs from a sensor mechanism 46 having sensor(s) therein capable of measuring ambient dry-bulb temperature and relative humidity. By way of example only, the sensor mechanism 46 is mounted directly on a circuit board at the rear of the device 10. Other mounting arrangements and locations are possible. The controller 40 for this sensor mechanism 46 is also contained within this circuit board and electrically connected to the sensor mechanism 46. The controller 40 controls the timing of the registration roller 18 and media transport belt 20 based on signals from the sheet detection sensor 42 to feed the media sheets with proper timing to the image forming stations 100. The controller 40 is electrically connected to a high voltage power supply (HVPS) 48 and together therewith provide a control mechanism 50. The HVPS 48 in turn is electrically connected to the charge roll 104 and developer roll 106. The charge roll 104 is electrified to a predetermined voltage bias by the HVPS 48 that is adjusted or turned on and off by the controller 40. As mentioned above, the charge roll 104 applies an electrical charge to the PC drum surface which charges the entire surface in preparation of selected areas being discharged by the laser beam 112 to create the latent image. The developer roll 106 (and hence, the toner thereon) is charged to a voltage bias level by the HVPS 48 that is advantageously set between the voltage bias level of the charge roll 104 and the discharged latent image. As a result of the imposed voltage bias differences, the toner carried by the developer roll 106 to the PC drum 102 is attracted to the latent image and repelled from the remaining higher charged areas of the PC drum 102. At this point in the image formation process, the latent image is said to be developed.

The controller 40 uses feedback from the registration sensor 44 to control latent image formation on the PC drum 102 to correct for registration errors. To detect registration errors, the controller 40 causes the image forming device 10 to print a registration pattern on a substrate. In one exemplary embodiment shown in FIG. 3, the registration pattern is printed on the media transport belt 20. The printer could, alternatively, print the registration pattern on an ITM belt, or on the print media. The registration sensor 44 measures the amount of light reflected by the registration pattern and generates an output signal that is fed back to the controller 40. The controller 40 takes appropriate corrective action based on the output signal from the registration sensor 44.

Referring now to FIG. 3, there is illustrated one exemplary method of printing registration patterns by using the reverse transfer process, as described in detail in the above-cited U.S. Pat. No. 7,257,358. The first image forming station 100 prints a first registration mark, which may be black, on the media transport belt 20 or ITM belt. The latent image of a second registration mark is formed on the PC drum 102 of the second image forming station 100 in a normal manner as if it were printing an overlapping registration mark. The laser beam 112 reduces the charge on the surface of the PC drum 102 from approximately −1000 v to approximately −300 v in the discharged area to form the latent image. Toner at the second image forming station 100 is prevented from developing the latent image on the PC drum 102, regardless of PC charge or discharge level, by setting the developer bias voltage to a value low enough to prevent development of the latent image on the PC drum 102. For example, the developer bias voltage may be set to approximately −100 v. The transfer unit 108 of the second image forming station 100 is also set to a voltage level that will repel properly-charged toner (typically −500 v to −1200 v). As the registration mark printed by the first image forming station 100 reaches the second image forming station 100, the toner applied to the media transport belt 20 by the first image forming station 100 is moved by the electric field to the surface with the more positive potential, i.e., the discharged area of the PC drum 102 of the second image forming station 100. If the transfer voltage at the second image forming station 100 is negative (instead of positive), and has an absolute value greater than the absolute value of the discharged area of the PC drum 102, the toner transferred to the media transport belt 20 or ITM belt by the first image forming station 100 will be transferred to the surface of the PC drum 102 at the second image forming station 100 where the undeveloped latent image on the PC drum 102 overlaps the registration mark produced by the first image forming station 100. The toner is then cleaned from the second PC drum 102 in a normal manner. Toner applied to the media transport belt 20 is removed by the cleaning blade 34 (FIG. 1) after the belt 20 has passed the registration sensor 44. Using this approach, if the registration marks from the first and second stations 100 overlap perfectly, there will be minimal or no toner remaining on the media transport belt 20 after the second image forming station 100. In effect, the second image forming station 100 removes toner from the media transport belt 20 or ITM belt where there is image overlap. Toner is left on the media transport belt 20 or ITM belt where the images do not overlap indicates the presence of registration errors which are detected by the registration sensor 44. After any registration errors are detected by the registration sensor 44 and inputted to the controller 40, the controller 40 takes appropriate measures to correct for such errors.

To carrying out the foregoing reverse transfer process so as to improve color registration, the controller 40 employs an auto-alignment adjustment algorithm to adjust charge and developer roll voltage biases based on wet-bulb temperatures from a lookup table set forth in FIG. 4 in accordance with the present invention which is stored in a memory 52 connected to the controller 40. The controller 40 adjusts the voltage biases of the charge roll 104 and developer roll 106 via the HVPS 48 based on certain environmental conditions, namely, wet-bulb temperature calculated from ambient dry-bulb temperature and relative humidity as measured by sensor mechanism 46. In the lookup table, a set of wet-bulb temperature values are listed that correlate to sets of voltage values that are to be used to adjust the voltage biases of the charge roll 104 and developer roll 106 at each of the image forming stations 100 in order to create the maximum potential difference between charged and uncharged areas of the PC drum while avoiding Paschen breakdown. In such manner, these operating parameters of the device 10 are mapped in memory 52 to different values of wet-bulb temperature. For the purposes of understanding the present invention with due brevity and clarity, only a subset of these mapped or correlated sets of values are listed in the lookup table illustrated in FIG. 4. A more complete set of values comparable to the ones in the lookup table would be stored in the memory 52 connected to the controller 40.

By way of further explanation, the values in FIG. 4 are for an embodiment where black (K) toner is developed at the first image forming station 100, also known as the image forming station. In this embodiment the second image forming station 100, also known as the reverse transfer station, may normally develop magenta (M), cyan (C), or yellow (Y) toner. The table in FIG. 4 shows that the bias voltage of the charge roll 104 is decreased at the second image forming station 100 as wet-bulb temperature increases thereby preventing wrong-signed toner development due to Paschen breakdown for environments with high wet-bulb temperatures where Paschen breakdown is more likely to occur. Alternatively, the bias voltage of the charge roll 104 is increased in environments with lower wet-bulb temperatures where Paschen breakdown is less likely to occur in order to increase the potential difference between the charged and discharged areas. In addition, the bias voltage of the developer roll 106 at the second image forming station 100 is increased as much as possible without allowing right-signed toner development in order to further minimize the potential difference between the developer roll 106 and PC drum 102 and the effects of Paschen breakdown.

Also, it should be noted that the lookup table in FIG. 4 shows values for an embodiment with independent charge supplies. In contrast thereto, the lookup table in FIG. 5 shows values for an embodiment with a shared charge supply, that is, where the charge roll HVPS is shared between the image forming and reverse transfer stations. The voltage bias of the image forming developer roll 106, in this case black (K), is adjusted positively or negatively based on wet-bulb temperature as voltage bias of the charge roll 104 is adjusted positively or negatively, thereby maximizing the amount of developed toner in imaged areas while avoiding the development of right-signed toner in non-imaged areas.

Wet-bulb temperature is the temperature of a volume of air that is cooled to saturation at constant pressure by evaporating water into the air without adding or removing heat. A wet-bulb thermometer approximates wet-bulb temperature by measuring the temperature of the tip of the thermometer covered by a wet cloth. When the relative humidity is below 100%, water evaporates from the cloth and effectively cools the tip of the wet-bulb thermometer. Essentially, wet-bulb temperature is a quantity that combines temperature and humidity into a single value that can be used to differentiate one environmental condition from another. Though temperature and humidity measurements change significantly within the first several minutes of printing, wet-bulb temperature does not change significantly for a given environment, and serves as a quantity that can be used to determine ambient environmental conditions regardless of internal machine temperature. Iterative numerical-methods techniques were used to fit a quadratic surface to data taken from the psychrometric chart. The quadratic surface establishes an orthogonal relationship for dry-bulb temperature, relative humidity, and wet-bulb temperature. A best fit quadratic surface to approximate wet-bulb temperature as a function of dry-bulb temperature and relative humidity can be written in the following form: Z=AX^2+BY^2+CXY+DX+EY+F; where: A=−0.00079, B=−0.00047, C=0.00479, D=0.59473, E=0.10035, and F=−6.32789; and: X=Dry-bulb Temperature (° C.) read from a thermistor, Y=Relative Humidity (% RH), and Z=Wet-bulb Temperature (° C.).

Turning to FIG. 6, there is illustrate a flow diagram illustrating one exemplary embodiment of a method by which the aforementioned selected operating parameters, namely, the voltage biases applied on the charge roll 104 and developer roll 106, may be adjusted to improve color registration by the image forming device 10 based on the aforementioned selected environmental conditions, namely, the dry-bulb temperature and relative humidity. In step 200, the above-described reverse transfer process begins. Next, in response to initiation of the reverse transfer process in step 200, a routine is initiated in step 202 by which measurements made of dry-bulb temperature and relative humidity by the sensor mechanism 46 are read by the controller 40. In step 204, the wet-bulb temperature that correlates to the readings of sensor mechanism 46 is determined. In step 206, the values of the selected operating parameters of the device 10, namely the voltage biases of the charge and developer rolls 104, 106 are determined from the previously stored lookup table or map in memory 52 (step 208) using the wet-bulb temperature determined in step 204 to retrieve the correct values for these operating parameters. Finally, in step 210, the controller 40 may set these operating parameters accordingly for carrying out the reverse transfer process of the color registration by adjusting the voltage biases of the charge roll 104 and developer roll 106 at each of the image forming stations 100 in order to create the maximum potential difference between charged and uncharged areas of the PC drum while avoiding Paschen breakdown.

Additionally, environmental conditions of dry-bulb temperature and relative humidity may cause changes in the properties of EP components of the first station (the image forming or forward transfer station), resulting in more or less toner being developed. It is generally desired for the image from the first station to be as dense as possible, so environmental conditions at the first station may also be used to adjust the developer roll bias. This is especially useful in a system where the charge roll high voltage power supply (HVPS) is shared between the image forming and reverse transfer stations so that the bias at the image forming station is set as high as possible without developing right-signed toner for a given charge roll voltage level.

The foregoing description of several embodiments of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

What is claimed is:

1. A system for adjusting selected operating parameters of an image forming device to improve color registration based on selected environmental conditions, said system comprising:

a first image forming station to print a first registration mark on a substrate;

a second image forming station having a photoconductive unit, a charging unit and a developer unit cooperable together so as to at least partially erase the first registration mark printed on the substrate by said first image forming station to form a registration pattern in a reverse transfer process of the color registration performed at said second image forming station;

a sensor mechanism for measuring selected environmental conditions of dry-bulb temperature and relative humidity;

a control mechanism for reading said sensor mechanism to adjust the voltage biases of said charging and developer units of said second image forming station based on a wet-bulb temperature value so as to maintain a predetermined potential difference between charged and uncharged areas of said photoconductive unit of said second image forming station that avoids Paschen breakdown and the development of toner at charged areas of said photoconductive unit during the reverse transfer process of the color registration; and a memory connected to and accessible by said control mechanism and having stored therein lists of correlated values comprising a list of wet-bulb temperature values related to values of dry-bulb temperature and relative humidity measured by said sensor mechanism correlated with lists of voltage values related to voltage biases of said charging and developer units to maintain the predetermined potential difference between the charged and uncharged areas of said photoconductive unit during the reverse transfer process of the color registration.

2. The system of claim 1 wherein said sensor mechanism is electrically connected to said control mechanism.

3. The system of claim 1 wherein said control mechanism includes a controller.

4. The system of claim 3 wherein said sensor mechanism is disposed adjacent to said controller.

5. The system of claim 4 wherein said lists of correlated values are stored in a lookup table in said memory.

6. The system of claim 3 wherein said control mechanism also includes a high voltage power supply electrically connected to said controller.

7. The system of claim 6 wherein said sensor mechanism is electrically connected to said controller.

8. The system of claim 6 wherein said high voltage power supply is interposed and electrically connected between said controller and said charging and developer units.

9. The system of claim 8 wherein said sensor mechanism is electrically connected to said controller.

10. The system of claim 9 wherein said lists of correlated values are stored in a lookup table in said memory.

11. The system of claim 10 wherein said sensor mechanism includes a sensor for measuring dry-bulb temperature disposed adjacent to said controller.

12. The system of claim 10 wherein sensor mechanism includes a sensor for measuring relative humidity disposed adjacent to said controller.

13. The system of claim 8 wherein said lists of correlated values are stored in a lookup table in said memory.

14. A method for adjusting selected operating parameters of an image forming device to improve color registration based on selected environmental conditions, said method comprising:

at a first image forming station printing a first registration mark on a substrate;

at a second image forming station at least partially erasing the first registration mark printed on the substrate by the first image forming station to form a registration pattern in a reverse transfer process of the color registration performed at the second image forming station;

sensing selected environmental conditions of dry-bulb temperature and relative humidity so as to determine wet-bulb temperature values correlated with said dry-bulb temperature and relative humidity; and adjusting voltage biases of charging and developer units of the second image forming station based on the wet-bulb temperature value so as to maintain a predetermined potential difference between charged and uncharged areas of a photoconductive unit of the second image forming station that avoids Paschen breakdown and the development of toner at charged areas of the photoconductive unit during the reverse transfer process of the color registration.

15. The method of claim 14 further comprising storing a lookup table in memory containing lists of correlated values comprising a list of wet-bulb temperature values related to values of sensed dry-bulb temperature and relative humidity correlated with lists of voltage values related to voltage biases of said charging and developer units to maintain the predetermined potential difference between the charged and uncharged areas of the photoconductive unit during the reverse transfer process of the color registration.

16. The method of claim 15 further comprising accessing said lookup table from memory with a wet-bulb temperature value to determine a value of voltage biases to apply to said charging and developer units.

* * * * *